United States Patent [19]
Fitzpatrick et al.

[11] Patent Number: 5,774,867
[45] Date of Patent: Jun. 30, 1998

[54] MEETING CONFLICT RESOLUTION FOR ELECTRONIC CALENDARS

[75] Inventors: Gregory P. Fitzpatrick, Ft. Worth; Marvin L. Williams, Lewisville, both of Tex.

[73] Assignee: International Business Machines Corporation, Armonk, N.Y.

[21] Appl. No.: 37,983

[22] Filed: Mar. 25, 1993

[51] Int. Cl.$^6$ .................................................. G06F 17/60
[52] U.S. Cl. ............................ 705/8; 705/9; 364/705.08; 395/330
[58] Field of Search ................................ 364/401, 705.08; 395/161, 330; 705/8, 9

[56] References Cited

U.S. PATENT DOCUMENTS

| | | | |
|---|---|---|---|
| 4,626,836 | 12/1986 | Curtis et al. | 340/706 |
| 4,807,154 | 2/1989 | Scully et al. | 364/518 |
| 4,807,155 | 2/1989 | Cree et al. | 364/518 |
| 4,817,018 | 3/1989 | Cree et al. | 364/518 |
| 4,819,191 | 4/1989 | Scully et al. | 364/518 |
| 4,831,552 | 5/1989 | Scully et al. | 364/518 |
| 4,866,611 | 9/1989 | Cree et al. | 364/401 |
| 4,977,520 | 12/1990 | McGaughey, III et al. | 364/521 |
| 5,050,077 | 9/1991 | Vincent | 364/401 |
| 5,070,470 | 12/1991 | Scully et al. | 364/705.08 |
| 5,093,901 | 3/1992 | Cree et al. | 395/100 |
| 5,124,912 | 6/1992 | Hotaling | 364/401 |
| 5,129,057 | 7/1992 | Strope et al. | 395/161 |
| 5,303,145 | 4/1994 | Griffin et al. | 364/401 |
| 5,311,423 | 5/1994 | Clark | 364/401 |
| 5,323,314 | 6/1994 | Barber et al. | 364/401 |

OTHER PUBLICATIONS

"Meeting Schedular" by Bob Chappell, pp. 72–74 Microcomputer Printout, Nov. 1982.

*Primary Examiner*—Gail O. Hayes
*Assistant Examiner*—Joseph Thomas
*Attorney, Agent, or Firm*—Norman L. Gundel

[57] ABSTRACT

A method and apparatus are provided for camping on an electronic calendar. In one embodiment, the invention determines, in response to an input of a date, a time and a duration of a proposed meeting between a meeting requester and a target, that a conflicting event appears on the target's electronic calendar, monitors the target's electronic calendar to detect the removal of the conflicting event, and schedules a meeting between the requester and the target on their electronic calendars in response to the detection of the removal of the conflicting event.

18 Claims, 3 Drawing Sheets

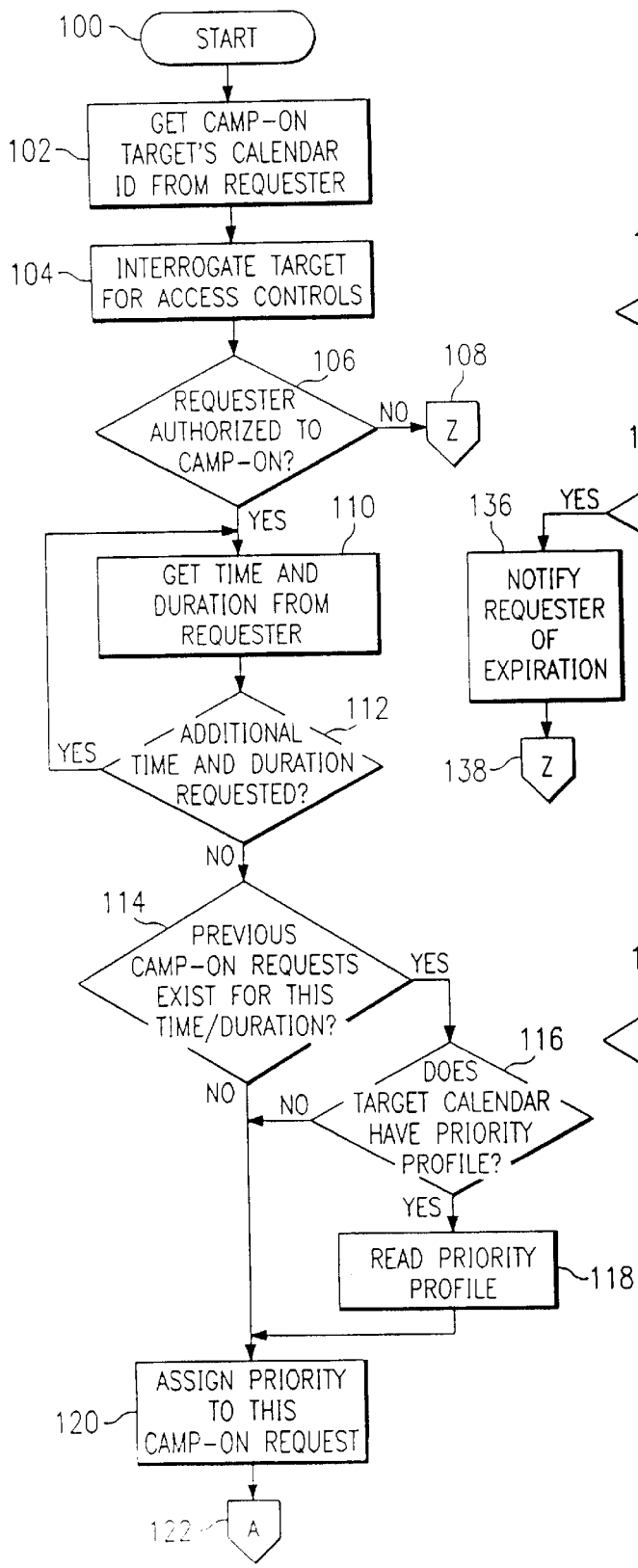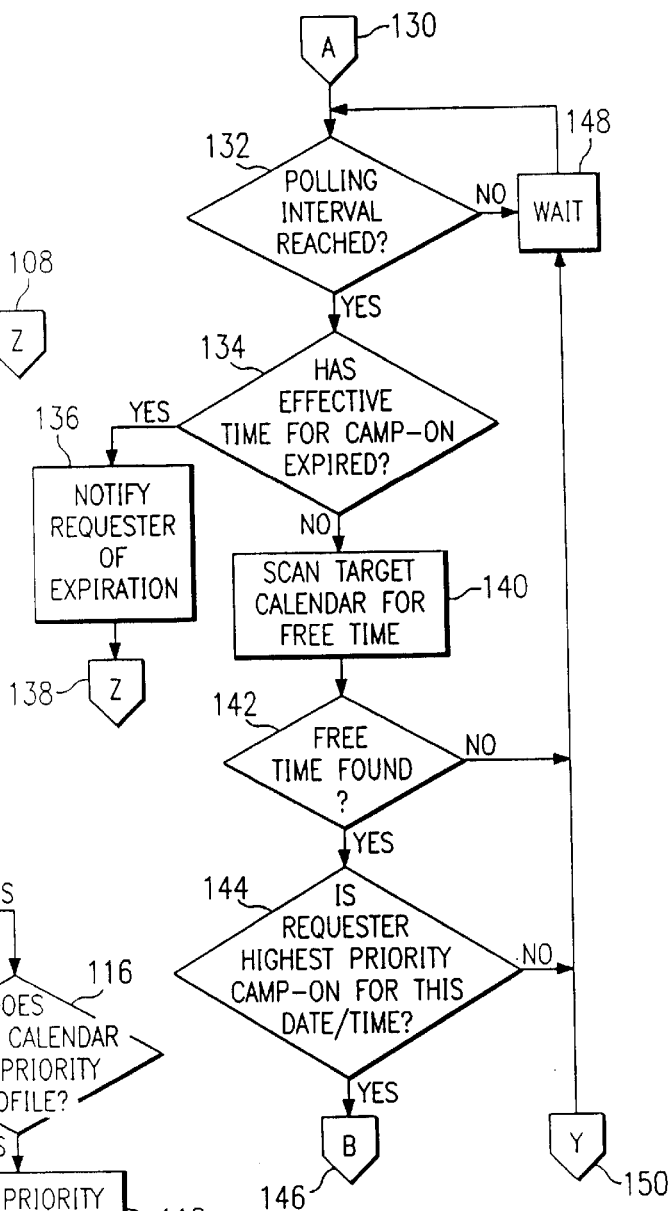

5,774,867

MEETING CONFLICT RESOLUTION FOR ELECTRONIC CALENDARS

BACKGROUND OF THE INVENTION

1. Field of the Invention

The present invention relates to a data processing system, and more particularly, to a data processing system having an electronic calendar application that is capable of scheduling meetings.

2. Description of the Related Art

A data processing system may be provided with an electronic calendar application. An electronic calendar application may allow persons, called users, to maintain and coordinate, on the data processing system, individual on-line schedules called electronic calendars and to schedule meetings among users maintaining such electronic calendars.

To schedule such a meeting, a user may input desired meeting attendees, such as a requester and a target with whom the requester wishes to meet. The user may also input one or more proposed dates, times and durations for the proposed meeting. The electronic calendar application accesses the electronic calendars of the proposed attendees, the requester and the target, and determines whether they are available to attend the meeting on the proposed date and time for the proposed duration.

If the proposed attendees' electronic calendars show that all proposed attendees are available at the proposed date, time and duration, the application places the meeting on each attendee's electronic calendar. However, if one or more proposed attendee's electronic calendars show that one or more of the proposed attendees is unavailable because of a conflicting event on the proposed attendee's electronic calendar at the proposed date, time and duration, the application advises the user that the meeting cannot, at that instant, be scheduled as requested.

The user may input multiple proposed dates, times or durations or repeat the process for different proposed dates, times or durations, consider whether the meeting may proceed without the unavailable proposed attendee, or repeat the process later when the conflicting event may have been removed from the unavailable proposed attendee's electronic calendar. However, even if the conflicting event is later removed from the proposed attendee's electronic calendar, another conflicting event may be scheduled on that electronic calendar before the user succeeds in scheduling the meeting. A data processing system is needed that will camp on one or more particular dates, times and durations of a proposed attendee's electronic calendar and schedule a meeting at one of the particular dates, times and durations as a result of the removal of a conflicting event from the proposed attendee's electronic calendar.

SUMMARY OF THE INVENTION

In accordance with the invention, a method and apparatus are provided for camping on an electronic calendar. In one embodiment, the invention determines, in response to an input of a date, a time and a duration of a proposed meeting between a meeting requester and a target, that a conflicting event appears on the target's electronic calendar, monitors the target's electronic calendar to detect the removal of the conflicting event, and schedules a meeting between the requester and the target on their electronic calendars in response to the detection of the removal of the conflicting event.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIGS. 2, 3 and 4 are a high level logic flowchart illustrating the method of a preferred embodiment of the method of the present invention.

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
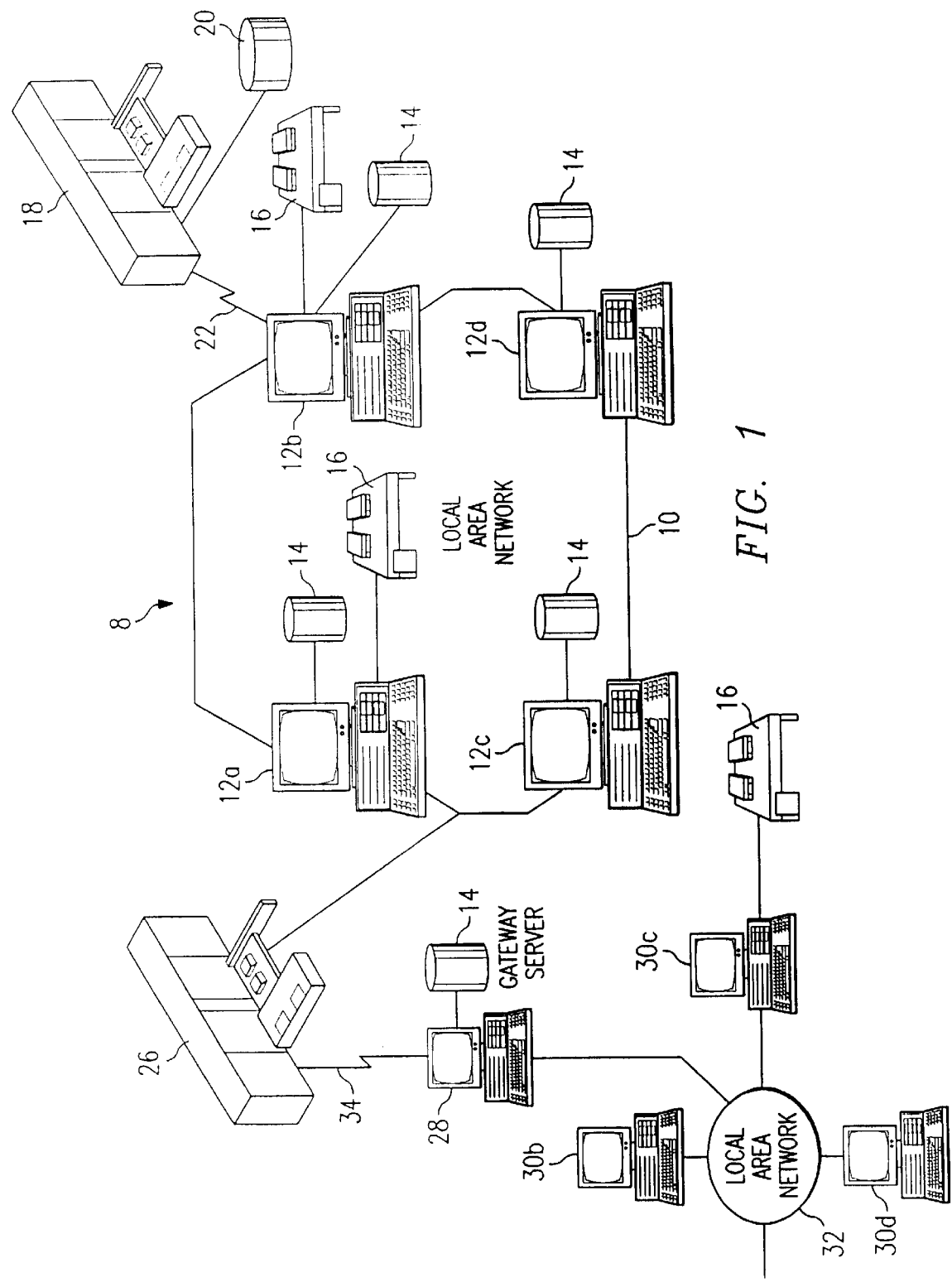
FIG. 1 is a block diagram of an apparatus used in performing the method of a preferred embodiment of the present invention and forming a part of the apparatus of a preferred embodiment of the present invention.

With reference now to the figures, and in particular with reference to FIG. 1, there is shown a pictorial representation of a data processing system 8 which may be used to implement the method and apparatus of the present invention. As may be seen, data processing system 8 may include a plurality of networks, such as local area networks 10 and 32, each of which preferably includes a plurality of individual computers 12a, 12b, 12c, and 12d; and 30a, 30b, 30c, and 30d, respectively. Alternatively, a plurality of intelligent workstations or dumb terminals coupled to a host processor may be utilized for each such network.

Each individual computer may be coupled to a storage device 14 and/or a display printer/output device 16. One or more such storage devices 14 may be utilized to store various documents or software applications, which may be addressed by a user of each individual computer within the data processing system 8.

Still referring to FIG. 1, data processing system 8 may also include multiple mainframe computers, such as mainframe computer 18, which may be preferably coupled to local area network 10 by means of communications link 22. Mainframe computer 18 may also be coupled to a storage device 20 which may serve as remote storage for local area network 10 and may also be coupled by a communications controller 26 and communications link 34 to gateway server 28. Gateway server 28 is preferably an individual computer or intelligent workstation which serves to link local area network 32 to local area network 10.

Still referring to FIG. 1, the data processing system 8 preferably also includes an electronic calendar application. The electronic calendar application preferably allows individual persons, called users, who may use individual computers of the data processing system 8, to maintain individual electronic calendars on the data processing system 8. Individual electronic calendars may also be maintained on the data processing system 8 for physical assets such as conference rooms. Each individual electronic calendar will accept individual electronic calendar events. Each such event may include a start date and time and either a stop time or a duration of the event on a particular day or days. Each such electronic calendar event may also include information describing the scheduled location of the event.

The electronic calendar application of data processing system 8 preferably allows users to schedule meetings among users maintaining individual electronic calendars on data processing system 8. To schedule such a meeting, a user may input desired meeting attendees, such as a requester and a target with whom the requester wishes to meet. The user may also input one or more proposed dates, times and durations for the proposed meeting. A stop time may be input instead of a duration; the term duration as used herein shall refer to either a duration or a stop time. The electronic calendar application accesses the electronic calendars of the proposed attendees, the requester and the target, and determines whether they are available to attend the meeting on any of the proposed dates and times for the proposed durations.

If the proposed attendees' electronic calendars show that all proposed attendees are available at one or more proposed date, time and duration, the application places the meeting on each attendee's electronic calendar, offering the user a choice if more than one meeting time is available. However, if one or more proposed attendee's electronic calendars show that one or more of the proposed attendees is unavailable because of a conflicting event on a proposed attendee's electronic calendar at each of the proposed dates, times and durations, the application advises the user that the meeting cannot, at that instant, be scheduled as requested.

The present invention permits the proposer to "camp on" date(s), time(s) and duration(s) of the proposed meeting. Then, if, before any such date and time, a conflicting event of a proposed attendee during the duration at such date, time and duration camped on is cancelled, the invention checks the electronic calendars of all other proposed attendees at that date, time and duration. If the other attendees have no conflicting events scheduled, the invention places the proposed meeting on the electronic calendars of all attendees at that date and time for that duration.

Figure 4:
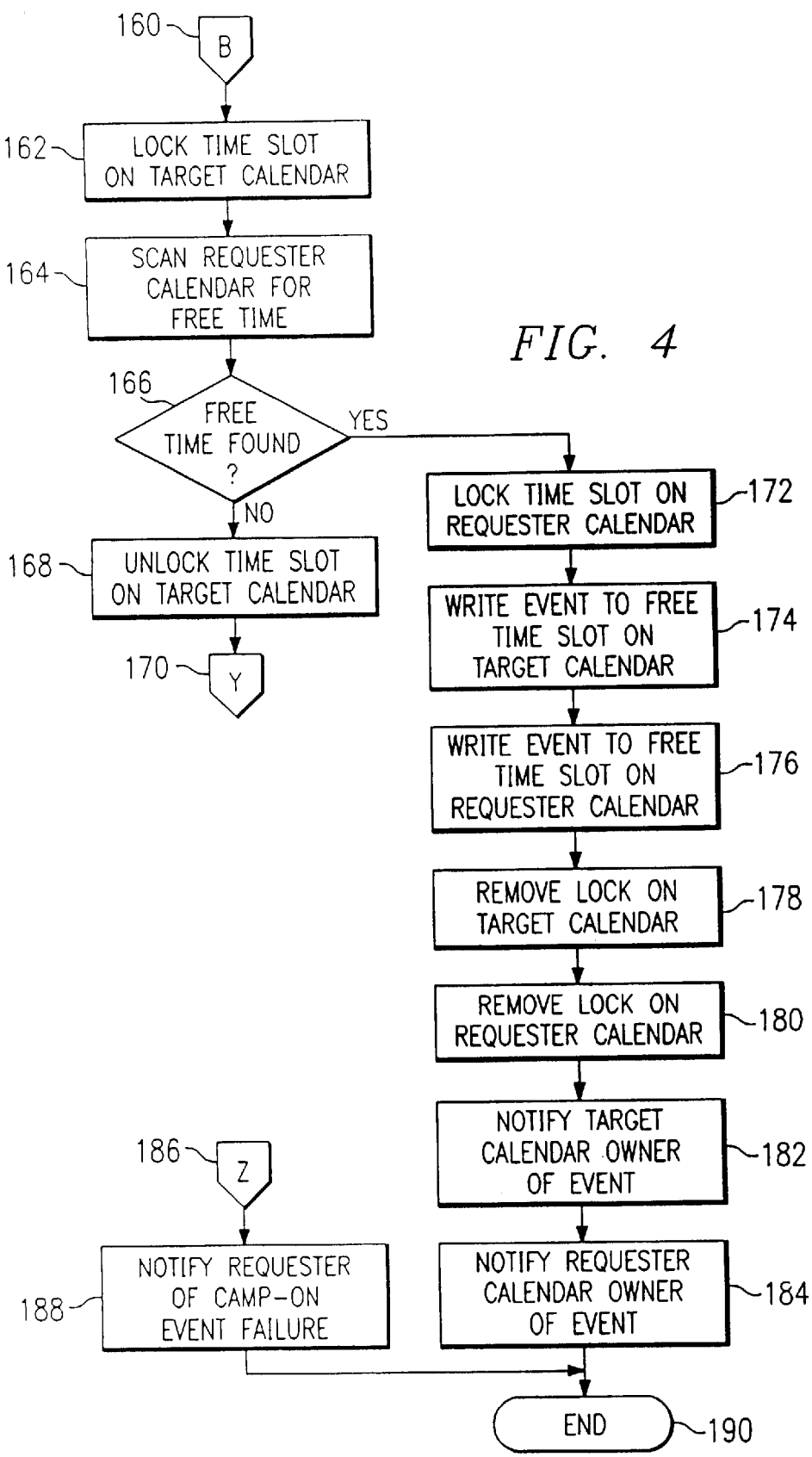

With reference now to FIGS. 2, 3 and 4, there is depicted a high level logic flowchart which illustrates the method of a preferred embodiment of the present invention for camping on an electronic calendars. Initiation of the process is preferably offered to a requester or other user as a choice after an unsuccessful attempt to schedule a meeting using the electronic calendar application of the data processing system 8; however, the process may be initiated without a prior attempt or failure to schedule a meeting.

With reference first to FIG. 2, the process is initiated at block 100 and proceeds to get the electronic calendar ID for the camp on target at block 102. The camp on target may be any intended attendee of the proposed meeting but is preferably a proposed attendee whose electronic calendar contains a conflicting event at one or more of the dates, times and durations of the proposed meeting. An electronic calendar ID is an electronic address or identifier that unambiguously identifies the electronic calendar of a particular individual user or entity. If the camp on process is initiated after an unsuccessful attempt to schedule a meeting with the target, the data processing system may preferably in block 102 offer the target's electronic calendar ID for selection.

From block 102, the process proceeds to block 104 and interrogates the target's electronic calendar for access controls. Electronic calendar applications may provide access controls to allow a user to specify which users are authorized to view or change the specifying user's electronic calendar. This invention contemplates that the access control upon changing an electronic calendar may also provide access control for camping on an electronic calendar. Alternatively, specifiable access controls may be provided separately for change and camp on. Additionally, as will be discussed below, the user may provide a priority profile in which priorities may be assigned to users who are authorized to initiate camp on requests on the specifying user's electronic calendar.

The process then proceeds from block 104 to block 106 and determines whether the requester is authorized to camp on the target's calendar. The preferred embodiment disclosed herein assumes that the requester, a user who wants to meet with the target user, is also the user initiating the camp on of the target's calendar. However, if the user who initiates the camp on request is not included in the potential attendees of the proposed meeting, block 106 may optionally determine whether the initiating user is authorized to camp on the target's electronic calendar. If the proposed camp on is not authorized, the process proceeds to off page connector 108 and thence to block 186 of FIG. 4. If the proposed camp on is authorized, the process proceeds from block 106 to block 110 for the input of the date, time and duration of the proposed meeting. The date, time and duration may be specific, such as Mar. 25, 1993 at 2:00 pm CST for 90 minutes, or may include ranges of dates, times and durations, such as a 90 minute meeting any time either between 8:00 and 5:00 pm on Mar. 22, 1993 or between 1:00 pm and 4:00 pm on Mar. 24, 1993. Input of other possible meeting scheduling criteria are also contemplated in the input of date, time and duration of block 110.

As in block 102 above, the data processing system 8 may in block 110 prompt for input with the date, time and duration of a previous unsuccessful attempt to schedule a meeting. The process then proceeds to block 112 for a determination of whether input of alternative dates, times or durations for the proposed meeting is desired. If yes, the process returns to block 110 and permits additional input. If no, the process proceeds to block 114.

Blocks 110 and 112 permit multiple dates, times and durations to be input for camp on. Preferably, each such camp on is processed separately by the invention. The remaining portions of the preferred process described herein illustrates the processing of one such date, time and duration. Other dates, times and durations may be processed separately in accordance with the same process.

In block 114, the process determines whether any previous camp on requests exist on the target's calendar for the date and time and during the duration specified. If yes, the process proceeds to block 116 for a determination of whether the target calendar has an associated priority profile, as discussed above. If yes, the process proceeds to block 118 and reads the target's priority profile. The process then proceeds to block 120 and assigns the camp on request a priority in accordance with the target's priority profile, assigning a default profile if a priority is not otherwise specified for the requester or other initiating user.

Returning to block 114, if the process determines that no previous camp on requests exist for this date and time on the target's calendar, the process proceeds to block 120 and assigns the camp on request a default priority. Similarly, in block 116, if the process determines that the target calendar has no priority profile, the process also proceeds to block 120 and assigns the camp on request a default priority. The default priority may be based upon a first come, first served priority. From block 120, the process proceeds to off page connector 122 and thence to block 130 of FIG. 3.

Turning now to FIG. 3, the process proceeds from block 130 to block 132 for a determination of whether the next electronic calendar polling interval has been reached. If no, the process proceeds to block 148, waits until the next polling interval is reached, and then returns to block 132.

If the process determines in block 132 that the next polling interval has been reached, the process then proceeds to block 134 for a determination of whether the date and time of the meeting requested in the camp on request has passed. If that date and time has passed, the effective time for the camp on request has expired. If the process determines that the camp on request has expired, the process proceeds to block 136 and notifies the requester or other initiating user of the expiration of the camp on request. The process then passes to off page connector 138 and thence to block 186 of FIG. 4.

Returning to block 134, if the process determines that the camp on request has not expired, the process passes from block 134 to block 140 and scans the target calendar for free time at the date and time and during the duration of the camp on request. The process then proceeds to block 142 for a determination of whether free time was found on the target's calendar at the date and time and for the duration of the camp on request. If no, the process proceeds to block 148 and waits for the next polling interval and then proceeds to block 132. If yes, the process passes from block 142 to block 144.

In block 144, the process determines whether the target calendar has any camp on request having a higher priority than this camp on request for this time, date and duration. If no, the process passes to block 148 and waits for the next polling interval. If yes, the process proceeds to off page connector 146 and thence to block 160 of FIG. 4.

In FIG. 4, the process proceeds from block 160 to block 162, where it locks the time slot on the target's calendar that corresponds to the date, time and duration of the camp on request. The process then proceeds to block 164 and scans the calendar of the requester for free time at the date and time and for the duration of the camp on request. The process then proceeds to block 166 for a determination of whether free time was found on the requester's calendar at the date and time and for the duration of the camp on request. If no, the process proceeds to block 168 and unlocks the time slot on the target's calendar that was locked in block 162 of the process described above. The process then proceeds to off page connector 170 and returns to block 150 and thence to block 148 of FIG. 3 to wait for the next polling interval, as described above.

Returning to block 166, if free time was found on the requester's calendar at the date and time and for the duration of the camp on request, the process proceeds to block 172 and locks the time slot on the requester's calendar that corresponds to the date, time and duration of the camp on request. The process then proceeds to block 174 and writes the event represented by the camp on request to the locked free time slot on the target's calendar. The process then proceeds to block 176 and writes the event represented by the camp on request to the locked free time slot on the requester's calendar. The process then proceeds to block 178 and removes the lock from the target's calendar that was set by block 162 described above. The process then proceeds to block 180 and removes the lock from the requester's calendar that was set by block 172 described above. The process then proceeds to block 182 and notifies the owner of the target calendar of the scheduling of the meeting in response to the camp on request. The process then proceeds to block 184 and notifies the requester, and also the initiating user if different from the requester, of the scheduling of the meeting in response to the camp on request. The process may optionally in block 184 offer the requester or other initiating user the option of cancelling any camp on of any alternative dates, times and durations of the proposed meeting that were input in blocks 110 and 112 above. The process then proceeds to block 190 and terminates.

Turning to block 186, the process arrives at block 186 upon an unsuccessful camp on request and then passes to block 188 and notifies the requester or other initiating user of the failure of the camp on request. The process then passes to block 190 and terminates.

Upon reference to the foregoing, it will be appreciated that the applicants have provided a novel and useful method and apparatus for camping on an electronic calendar. While the invention has been particularly shown and described with reference to a preferred embodiment and process, it will be understood that various changes in form and detail may be made therein without departing from the spirit and scope of the invention.

What is claimed is:

1. A method, performed in a data processing system, for scheduling a meeting between a requester and a target on an electronic calendar maintained on the data processing system by the target, wherein said requester and said target are separate entities, the method comprising the computer implemented steps of:

determining, in response to an input, to the data processing system, of a date, a time and a duration of a proposed meeting between the requester and the target, that a conflicting event appears on the electronic calendar maintained on the data processing system by the target for the date and time and during the duration input to the data processing system;

in response to a selection, by the requester, upon the determination that a conflicting event appears on the electronic calendar maintained by the target, to monitor the electronic calendar maintained by the target for the removal of the conflicting event, and also in response to the determination that the conflicting event appears on the electronic calendar maintained by the target, monitoring the electronic calendar maintained by the target to detect the removal of the conflicting event from the electronic calendar maintained by the target; and scheduling a meeting between the requester and the target on the electronic calendar maintained by the target, in response to the detection of the removal of the conflicting event from the electronic calendar maintained by the target.

2. The method of claim 1, further including the computer implemented step of scheduling a meeting between the requester and the target on an electronic calendar maintained, on the data processing system, by the requester in response to the detection of the removal of the conflicting event from the electronic calendar maintained by the target.

3. The method of claim 1, further comprising the computer implemented step of notifying the target and the requester of the scheduling of the meeting.

4. The method of claim 1, further comprising the computer implemented step of determining, in response to the input, to the data processing system, of the date, the time and the duration of the proposed meeting between the requester and the target, and prior to scheduling the meeting between the requester and the target on the electronic calendar maintained by the target, that no conflicting event appears on an electronic calendar maintained on the data processing system by the requester for the date and time and during the duration input to the data processing system.

5. The method of claim 4, wherein the computer implemented step of scheduling a meeting between the requester and the target on the electronic calendar maintained by the target in response to the detection of the removal of the conflicting event from the electronic calendar maintained by the target includes the computer implemented step of scheduling a meeting between the requester and the target on the electronic calendars maintained by the requester and by the target in response to both the detection of the removal of the conflicting event from the electronic calendar maintained by the target and also the determination that no conflicting event appears on the electronic calendar maintained on the data processing system by the requester at the date and time and during the duration input to the data processing system.

6. The method of claim 5, wherein the meeting is scheduled for the date, time and duration input to the data processing system.

7. The method of claim 6, further comprising the computer implemented step of notifying the target and the requester of the scheduling of the meeting.

8. The method of claim 6, wherein the meeting between the requester and the target is scheduled on the electronic calendar maintained by the target without input from the target.

9. The method of claim 1, wherein the meeting between the requester and the target is scheduled on the electronic calendar maintained by the target without input from the target.

10. A data processing system for scheduling a meeting between a requester and a target on an electronic calendar maintained on the data processing system by the target, wherein said requester and said target are separate entities, comprising:

means for determining, in response to an input, to the data processing system, of a date, a time and a duration of a proposed meeting between the requester and the target, that a conflicting event appears on the electronic calendar maintained on the data processing system by the target for the date and time and during the duration input to the data processing system;

means for monitoring the electronic calendar maintained by the target to detect the removal of the conflicting event from the electronic calendar maintained by the target, in response to a selection, by the requester, upon the determination that a conflicting event appears on the electronic calendar maintained by the target, to monitor the electronic calendar maintained by the target for the removal of the conflicting event, and also in response to the determination that the conflicting event appears on the electronic calendar maintained by the target; and means for scheduling a meeting between the requester and the target on the electronic calendar maintained by the target, in response to the detection of the removal of the conflicting event from the electronic calendar maintained by the target.

11. The data processing system of claim 10, further comprising means for scheduling a meeting between the requester and the target on an electronic calendar maintained, on the data processing system, by the requester in response to the detection of the removal of the conflicting event from the electronic calendar maintained by the target.

12. The data processing system of claim 10, further comprising means for notifying the target and the requester of the scheduling of the meeting.

13. The data processing system of claim 10, further comprising means for determining, in response to the input, to the data processing system, of the date, the time and the duration of the proposed meeting between the requester and the target, and prior to scheduling the meeting between the requester and the target on the electronic calendar maintained by the target, that no conflicting event appears on an electronic calendar maintained on the data processing system by the requester for the date and time and during the duration input to the data processing system.

14. The data processing system of claim 13, wherein the means for scheduling a meeting between the requester and the target on the electronic calendar maintained by the target in response to the detection of the removal of the conflicting event from the electronic calendar maintained by the target includes means for scheduling a meeting between the requester and the target on the electronic calendars maintained by the requester and by the target in response to both the detection of the removal of the conflicting event from the electronic calendar maintained by the target and also the determination that no conflicting event appears on the electronic calendar maintained on the data processing system by the requester at the date and time and during the duration input to the data processing system.

15. The data processing system of claim 14, wherein the meeting is scheduled for the date, time and duration input to the data processing system.

16. The data processing system of claim 15, further comprising means for notifying the target and the requester of the scheduling of the meeting.

17. The data processing system of claim 15, wherein the means for scheduling a meeting between the requester and the target on the electronic calendar maintained by the target are means for scheduling a meeting between the requester and the target on the electronic calendar maintained by the target without input from the target.

18. The data processing system of claim 10, wherein the means for scheduling a meeting between the requester and the target on the electronic calendar maintained by the target are means for scheduling a meeting between the requester and the target on the electronic calendar maintained by the target without input from the target.

* * * * *